June 17, 1969 T. A. SCANLON 3,450,839

SELECTIVE TRANSDUCER APPARATUS FOR PASSENGER VEHICLES

Filed Nov. 7, 1966 Sheet 1 of 2

INVENTOR
THOMAS ALBERT SCANLON

BY
William Frederick Werner
ATTORNEY

INVENTOR
THOMAS ALBERT SCANLON
BY William Frederick Werner
ATTORNEY

United States Patent Office 3,450,839
Patented June 17, 1969

3,450,839

SELECTIVE TRANSDUCER APPARATUS FOR PASSENGER VEHICLES

Thomas Albert Scanlon, Barrington, R.I., assignor to PM & E Electronics, Inc., East Providence, R.I., a corporation of Rhode Island Filed Nov. 7, 1966, Ser. No. 592,519
Int. Cl. H04m *1/02*
U.S. Cl. 179—1 5 Claims

ABSTRACT OF THE DISCLOSURE

This specification discloses transducer apparatus intended for installation at the seat of a passenger vehicle which enables a passenger to listen to any one of several regular or free audio programs with a regular headrest or any of these programs and a special program which is receivable only by a special headset for which a fee is paid. The apparatus comprises a transducer, a sound tube headset, a detachable connection between the headset and the transducer, a plurality of audio circuits, a switch for selectively connecting one of said circuits to the transducer, one of said circuits being interrupted by spaced contacts, and a key included in said detachable connection for bridging said contacts to complete said one circuit when it is selected by said switch.

This invention relates to electrical circuit selection means, and more particularly to a sound tube head set which cooperates with a transducer assembly to permit selection of a particular electrical circuit in a plurality of electrical circuits.

In recent years, the provision of entertainment such as motion pictures, television, radio broadcasts, and recorded music for passengers on airplanes and railway trains has become increasingly popular.

In the prior art, passengers were provided with a sound tube head set for insertion into a transducer block and a selector switch was provided to permit the passenger to selectively complete the electrical circuit of a desired sound channel to the input of the transducer unit, whereby the output sound of the selected channel is transmitted to the sound tube head set.

With the advent of a service charge for particular forms of entertainment provided for airplane and railway passengers, such as motion picture spectaculars, for example, it has become necessary to isolate the circuit for which a charge is being made, or the "pay" circuit, from the other or "non-pay" circuits connected to the input of the transducer block, so that the sound channel of the motion picture circuit, for example, assuming that the motion picture circuit is the "pay" circuit, could be received only by a passenger who has paid the required fee.

Accordingly, it is an object of this invention to provide an apparatus for use in passenger entertainment systems on airplanes, railways, and the like which permits a particular electrical circuit to be selected out of a plurality of circuits only by a special class of users, namely, those who have been provided with special equipment for making such selection.

It is another object of the present invention to provide an apparatus particularly adapted for use in passenger entertainment systems which permits a "pay" circuit to be isolated from "non-pay" circuits so that only a passenger who has paid to see a particular type of entertainment having a charge in connection therewith is permitted to be connected to an electrical circuit associated with the "pay" entertainment.

It is another object of the invention to provide a sound tube head set and cooperating transducer block assembly in which the sound tube head set and the transducer block cooperate to complete the connection of a "pay" electrical circuit whereby only a passenger who has paid the required fee and who has been issued a special head set can be connected to the "pay" circuit.

In achievement of these objectives, there is provided in accordance with an embodiment of this invention a cooperating sound tube head set, specially provided to passengers who have paid a required fee, and a transducer housing or assembly, in accordance with which the plug-in connection between the head set and the transducer assembly includes cooperating electrical contacts on the sound tube head set and on the transducer assembly which complete the electrical connection of a "pay" circuit to selector switch contacts carried by the transducer assembly, so that the passenger to whom a special head set has been issued can receive the "pay" circuit as well as all of the "non-pay" circuits. A passenger who has not paid the fee for the special entertainment would be provided with a sound tube head set also capable of being plugged into the transducer assembly, but without the special contact means on the head set which completes the "pay" circuit, so that the non-paying passenger can only have his transducer assembly connected to the "non-paying" circuits.

Further objects and advantages will become apparent from the following description taken in conjunction with the accompanying drawings in which.

Figures 5, 6:
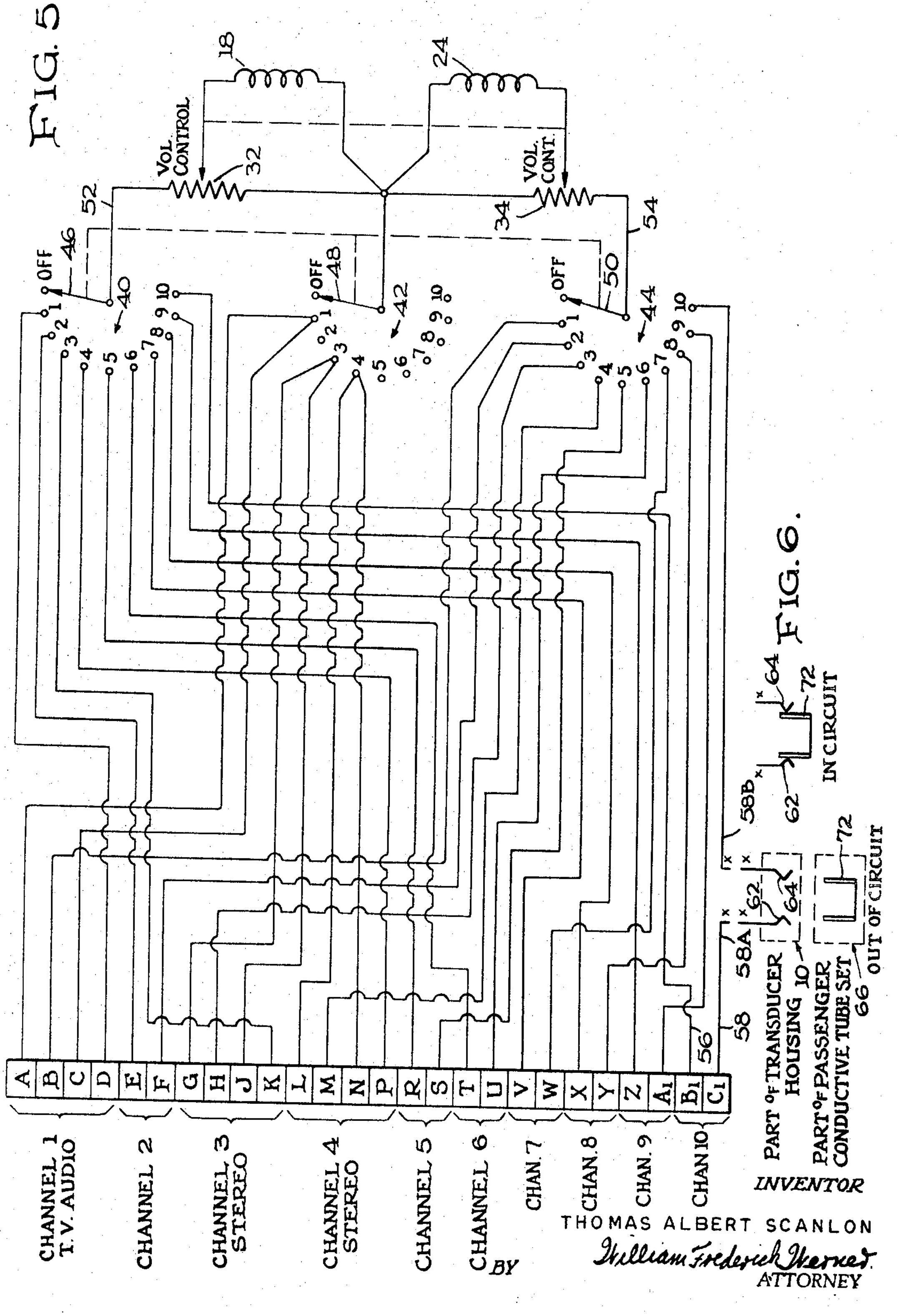

FIGURE 5 is a schematic wiring diagram showing the circuit connections of a typical passenger entertainment system with which the cooperating head set and transducer assembly of the invention might be used, with the cooperating contacts of the transducer housing and of the sound tube head set being shown in disengaged relation; and FIGURE 6 is a view showing the cooperating contacts of the transducer housing and of the sound tube head set in engaged electrically contacting position.

Referring now to the drawings, there is generally indicated at 10 a transducer housing assembly in which are positioned a pair of transducers generally indicated at 12 and 14, respectively. Transducer 12 includes a magnet 16, a voice coil 18 and a diaphragm 20, while transducer 14 includes a magnet 22, a voice coil 24, and a diaphragm 26.

The sound output of the respective transducers 12 and 14 is communicated to a respective one of the sound chambers 28 and 30 with which the plug-in sound tube head set is in communication. Sound chambers 28, 30 terminate at their outer ends in female receptacles 29, 31 which are adapted to receive the male plug-in elements of the sound tube head set, as will be explained hereinafter.

A dual potentiometer including rotatable volume control potentiometers 32 and 34 is positioned within housing 10. Potentiometers 32 and 34 are mounted on a common shaft which is rotated by means of control knob 36. A selector switch generally indicated at 38, operated by control knob 39, is positioned inside transducer housing 10 and includes three banks or sections of fixed contacts generally indicated at 40, 42, and 44, and cooperating rotatable switch contacts 46, 48, and 50, which respectively selectively engage the fixed contacts of the respective banks of contacts 40, 42, and 44. The rotatable contacts 46, 48, and 50 may be selectively moved in unison by means of control knob 39 into contact with corresponding fixed contacts of the respective banks of contacts 40, 42, and 44, or into an "Off" position associated with each bank of contacts.

The contacts of the contact banks 40, 42, 44, are respectively numbered 1–10, inclusive, in the wiring diagram of FIG. 5 to correspond to the various input channels 1–10, all of which are assumed to be audio circuits. When the control knob 39 of the selector switch is rotated to any one of the positions such as "Off" or 1–10, inclusive, corresponding to the various circuit channels, the rotatable contacts 46, 48, and 50 will respectively be positioned in engagement with the corresponding fixed contacts 1–10 of their associated banks of fixed contacts.

As seen in the wiring diagram of FIGURE 5, one end of transducer winding or voice coil 18 is connected to the movable tap of volume control potentiometer 32. One end of volume control potentiometer 32 is connected by conductor 52 to movable switch contact 46 associated with switch contact bank 40. The opposite side of voice coil 18 is connected across the opposite end of volume control potentiometer 32 at a common junction which is connected to the rotable contact 48 associated with switch contact bank 42.

One end of transducer or voice coil 24 is connected to the movable tap of volume control potentiometer 34. One end of volume control potentiometer 34 is connected by conductor 54 to the rotatable switch contact 50 associated with contact bank 44. The opposite end of voice coil 24 is connected to the opposite end of the volume control potentiometer 34 and to the common junction of voice coil 18 and volume control potentiometer 32 which is connected to the rotatable contact 48 of switch contact bank 42.

As seen in FIGURE 5, the various sound channels which may be selectively connected to the voice coils of the transducer assembly are connected to the input terminals A–Z, inclusive, $A_1$, $B_1$, and $C_1$. The various input terminals just mentioned are connected to the circuit wiring in the airplane, train, or the like by means of a cable generally indicated at 51. Thus, in the illustrated embodiment, channel 1 is connected to input terminals A, B, C, D; channel 2 is connected to input terminals E, F; channel 3, which is assumed to be a stereo channel, is connected to input channels G, H, J. K; channel 4, which is also assumed to be a stereo channel, is connected to input terminals L, M, N, P; channel 5 is connected to input terminals R, S; channel 6 is connected to input terminals T, U; channel 7 is connected to input terminals V, W, channel 8 is connected to input terminals X, Y; channel 9 is connected to input terminals Z and $A_1$; and channel 10 is connected to input terminals $B_1$ and $C_1$. The input terminals just enumerated of the various channels are connected to switch contact banks 40, 42 and 44 in accordance with the particular connections required of the respective channels to the voice coils 18 and 24.

In the case of channel 1, for example, the input terminals A and C are connected in common to terminal 1 of switch contact bank 42, while input terminal B is connected to the input terminal 1 of the switch contact bank 44, and the input terminal D is connected to the terminal 1 of the switch contact bank 40. The connections of channel 1 just described permit separate electrical inputs to voice coils 18 and 24. The two stereo channels 3 and 4 are connected in a similar manner to that just described for channel 1. The remaining channels 2, 5, 6, 7, 8, 9 and 10 are each respecively connected in series across the voice coils 18 and 24, with no connection to the intermediate tap between the two voice coils 18 and 24 as in the case of channels 1, 3 and 4.

All of the audio channels 1–9, inclusive, have their respective conductors connected from the input terminals such as A, B, C, D, etc., directly to the correspondingly numbered terminals on the appropriate switch banks 40, 42 and 44, as required for the particular channels, so that a direct circuit connection is made to the potentiometers and voice coils when the selector switch control knob 39 is rotated to any one of the channels 1–9, inclusive. Thus, a passenger on the airplane or railway may receive the sound input to any of the channels 1–9 in the illustrated embodiment when he plugs the conventional sound tube set into the transducer assembly. However, in accordance with the present invention, the transducer block or assembly and the circuit connections of channel 10 are so arranged that a special sound tube set is required to receive channel 10. It will be understood, of course, that the invention is illustrated as applied to channel 10 merely by way of example, and that the invention could equally well be applied to any of the other channels and, with appropriate modifications could be applied to more than one channel.

Referring now to the schematic diagram of FIGURE 5, it will be noted that channel 10 is provided with two input terminals $B_1$ and $C_1$. Terminal $B_1$ of channel 10 is directly connected to terminal 10 of contact bank 40 by means of conductor 56. It will be noted by reference to FIGURES 3 and 5 of the drawing that conductor 58 consists of a conductor portion 58A which is connected at one of its ends to the input terminal $C_1$ of the transducer block and at its opposite end to an electrically conductive ring 62 which is fixedly positioned in a countersunk surface at the outer end of the female receptacle 29 communicating with sound chamber 28 on transducer block 10. Conductor portion 58B terminates at one end at terminal 10 of switch contact bank 44, and at its opposite end in a conductive ring 64 which is fixedly positioned in a countersunk surface at the outer end of the female receptacle 31 communicating with sound chamber 30 of transducer block or assembly 10. The part of the transducer assembly constituting at least the portions of sound chambers 28 and 30 contiguous to and defining the female receptacles 29 and 31 is formed of a suitable insulating material, whereby the conductive rings 62 and 64 are maintained in insulated relation to each other.

Figures 1, 2, 3, 4:
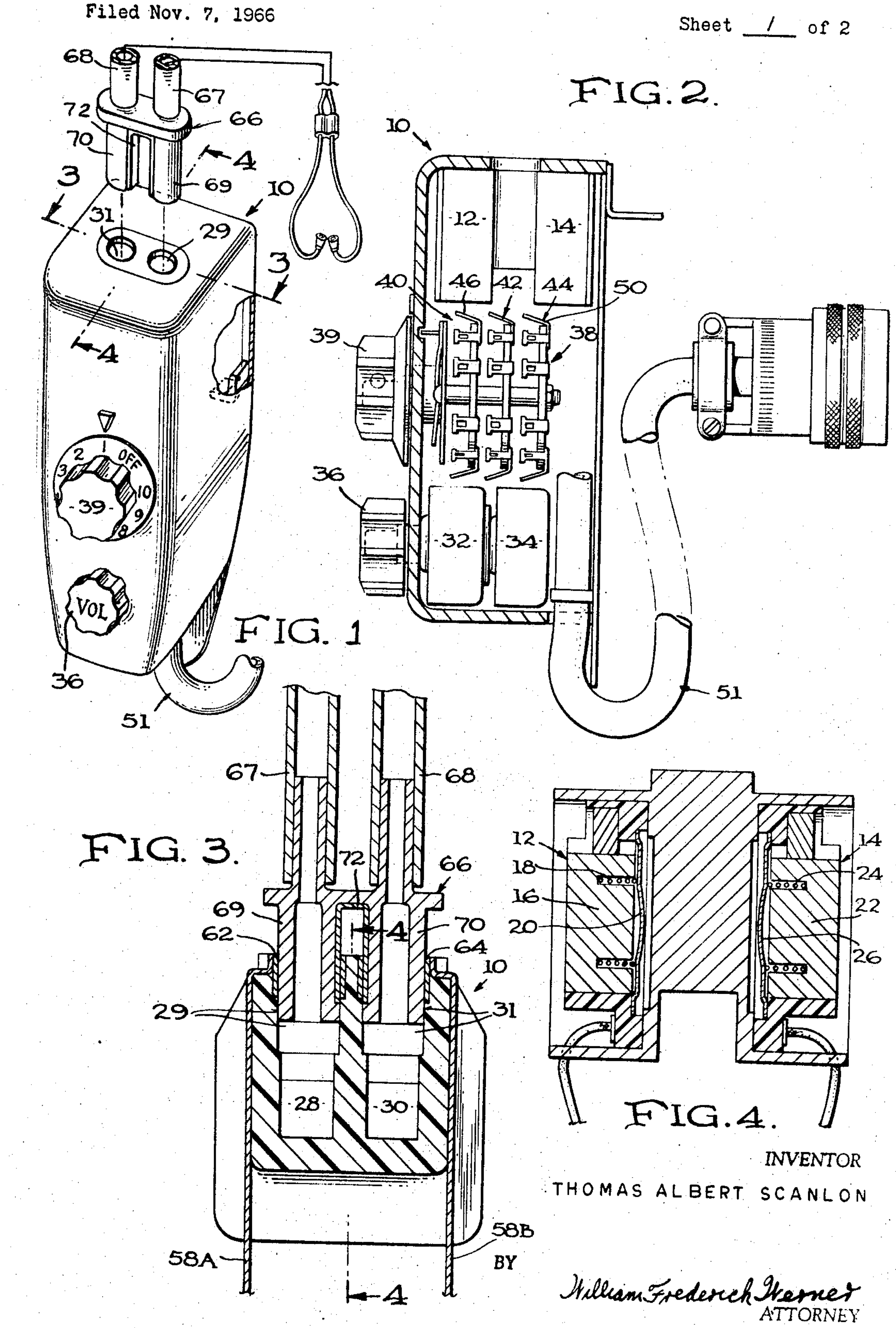
FIGURE 1 is a perspective view of a transducer housing and assembly adapted to receive a plug-in connection from a sound tube assembly in accordance with the invention.
FIGURE 2 is a view partially in vertical cross-section and partially in vertical elevation of the transducer housing and assembly of FIGURE 1.
FIGURE 3 is a view in cross-section taken substantially along line 3—3 of FIGURE 1 showing details of the plug-in connection between the sound tube head set and the transducer block.
FIGURE 4 is a view in section along line 4—4 of FIGURES 1 and 3.

The sound tube head set or assembly generally indicated at 66 in the illustrated embodiment comprises a plug-in member formed of plastic or other suitable insulating material terminating in two male plug-in members 69 and 70. Sound tubes 67 and 68 are connected to the plug-in member of sound tube head set 66. The male plug-in members 69 and 70 are adapted to engage the female receptacles 29 and 31 in which the conducting rings 62 and 64 are located. A U-shaped conducting member or surface 72 is provided in the space lying between the facing walls of the male plug-in elements 69 and 70 so that when the male sound tube plug-in elements 69 and 70 are engaged with the two female receptacles 29 and 31 of the transducer block, as seen in FIGURES 3 and 6, the U-shaped key-like conductive element or surface 72 carried by the sound tube plug-in elements engages the conductive rings 62 and 64 of the transducer block in bridging relation thereto to thereby close the circuit between the conductor portions 58A and 58B of the schematic diagram of FIGURE 5, and thereby establish an electrical connection from the input terminal $C_1$ of channel 10 directly to the terminal 10 of contact bank 44. Since conductor 56 is already directly connected from input terminal $B_1$ of the transducer block to terminal 10 of switch contact bank 40, the completion of the connection between conductor portions 58A and 58B as just described completes the connection of terminal $C_1$ to terminal 10 of switch contact bank 44, and thus completes the connection of channel 10 to the appropriate fixed contact banks of the selector switch.

Thus, the passenger who pays for the special entertainment is provided with a sound tube head set having the conductive bridging portion or "key" 72. When this special sound tube head set is plugged into the receptacles of the transducer assembly, an electrical circuit is completed connecting the "pay" channel to the appropriate contact bank or banks of the selector switch so that the passenger who has paid for the privilege may have his transducer assembly connected to the input from the "pay" channel when he turns his channel selector control switch to the "pay" channel. This same passenger may also receive all of the non-pay" channels.

On the other hand, the passenger who has not paid the appropriate fee for the special entertainment is provided with a sound tube set having a plug-in construction which is generally similar to that shown in FIGURE 3 of the drawings but which does not include the bridging conductive member or 'key" 72, so that the passenger who has not paid the special fee for hearing the "pay" program is able to receive all of the non-pay channels, such as channels 1–9, but is not able to receive the "pay" channel, such as channel 10 of FIGURE 5.

It can be seen from the foregoing that there is provided in accordance with this invention a combined plug-in arrangement for a sound tube assembly and transducer housing an accordance with which a selected electrical circuit may be completed by plugging in the sound tube assembly to the transducer block, whereby only a passenger who has paid the required fee can complete circuit connections of the "pay" channel to the transducer assembly. The passenger who has paid for the special "pay" program may also hear the "non-pay" programs. On the other hand, the passenger who has not paid to hear the "pay" program can plug his sound tube head set into the same receptacles of the transducer block, but since his head set is not provided with the special conductive portion 72, the head set provided to such passenger does not complete the "pay" circuit, as previously described.

While there has been shown and described a particular embodiment of the invention, it will be obvious to those skilled in the art the various changes and modifications that may be made therein without departing from the invention, and therefore it is aimed to cover all such changes and modifications as fall within the true spirit and scope of the invention.

What is claimed is:

1. In transducer apparatus intended for installation in a passenger vehicle including a plurality of audio circuits, one of which is a special circuit, a transducer, a transducer housing, a sound tube headset, a detachable connection between said headset and said transducer housing and including complemental elements on the transducer housing and headset respectively, a selector switch for connecting any one of said circuits to said transducer, said special circuit being interrupted by a pair of spaced contacts, and a key included in the detachable connection element of the headset for bridging said contacts to complete said special circuit.

2. The apparatus of claim 1 in which the detachable connection comprises a pair of sockets on the transducer housing, and a pair of plugs on the headset complemental to said sockets, and the key is carried by said plugs.

3. The apparatus of claim 2 in which the contacts take the form of a pair of spaced rings and the key is a U-shaped member which engages both said rings when the plugs are received in the sockets.

4. The apparatus of claim 1 in which the selector switch comprises a plurality of fixed contacts each of which is connected to one of said circuits and a movable contact arm connected to the transducer and adapted to engage any of said fixed contacts.

5. The apparatus of claim 1 in which a sound chamber is included in the transducer housing together with an adjustable volume control for the sound chamber.

References Cited

UNITED STATES PATENTS

| | | |
|---|---|---|
| 2,663,850 | 12/1953 | Mellinger et al. |
| 2,892,889 | 6/1959 | Jones. |

OTHER REFERENCES

German printed application, 1,156,441, Oct. 31, 1963.

KATHLEEN H. CLAFFY, *Primary Examiner.*

VAN C. WILKS, *Assistant Examiner.*